US012763104B2

(12) United States Patent
Myint et al.

(10) Patent No.: US 12,763,104 B2
(45) Date of Patent: Oct. 13, 2026

(54) ULTRASONIC MOTOR ROTARY ACTUATOR FOR HARD DISK DRIVE

(71) Applicant: Seagate Technology LLC, Fremont, CA (US)

(72) Inventors: Than Zaw Myint, Singapore (SG); Xiong Liu, Singapore (SG); Shi Wei Brendon Leong, Singapore (SG); Yichao Ma, Singapore (SG)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 19/086,416

(22) Filed: Mar. 21, 2025

(65) Prior Publication Data

US 2026/0290395 A1 Sep. 24, 2026

(51) Int. Cl.
*G11B 19/20* (2006.01)
*G11B 5/48* (2006.01)
*G11B 25/04* (2006.01)

(52) U.S. Cl.
CPC ........ *G11B 19/2009* (2013.01); *G11B 5/4813* (2013.01); *G11B 5/4873* (2013.01); *G11B 25/043* (2013.01)

(58) Field of Classification Search
None
See application file for complete search history.

(56) References Cited

U.S. PATENT DOCUMENTS 5,606,472 A * 2/1997 Akagi ................ G11B 19/2009 360/99.08
6,867,532 B2 * 3/2005 Brady .................. H02N 2/0065 310/323.02
7,834,516 B2 * 11/2010 Kang ..................... H02N 2/126 310/323.14
7,932,660 B2 * 4/2011 Hamamoto ............ H02N 2/004 310/323.01
11,727,957 B1 * 8/2023 Ma ......................... G11B 21/22 360/99.16
11,948,612 B2 4/2024 Mendonsa et al.
(Continued)

FOREIGN PATENT DOCUMENTS

JP 2000224876 A * 8/2000

OTHER PUBLICATIONS ip.com "Actuator Controlled by Ultrasonic Motor," Harada et al., Original Publication Date: Dec. 1, 1991, TDB n7b 12-91 p. 399-402. (Year: 1991).*

(Continued)

*Primary Examiner* — William J Klimowicz
(74) *Attorney, Agent, or Firm* — Mueting Raasch Group

(57) ABSTRACT

Described are piezoelectric ultrasonic motor (USM) assemblies to drive the rotary motion of an actuator arm assembly in a hard disk drive (HDD). Such USMs may be used in place of electromagnetic means such as a conventional voice coil motor (VCM). In particular, in accordance with various aspects, the present disclosure relates to the use of a USM that includes a ring-shaped piezoelectric element engineered to produce a traveling wave that actuates the rotation of a hub such as an E-block used in an HDD actuator stack. Such designs may be lighter weight, more cost-effective, more compact, and lower power than VCMs.

20 Claims, 7 Drawing Sheets

(56) References Cited

U.S. PATENT DOCUMENTS

| | | | | |
|---|---|---|---|---|
| 2007/0029900 | A1* | 2/2007 | Kang | H02N 2/126 310/348 |
| 2008/0174901 | A1* | 7/2008 | Tanimura | G11B 7/08576 |
| 2008/0297002 | A1* | 12/2008 | Oki | H10N 30/2023 310/323.16 |
| 2009/0015098 | A1* | 1/2009 | Matsuo | H10N 30/2023 310/317 |
| 2011/0063970 | A1* | 3/2011 | Yaeguchi | G11B 7/08582 369/144 |
| 2024/0412762 | A1* | 12/2024 | Ma | G11B 5/5521 |
| 2024/0413768 | A1* | 12/2024 | Cao | H02N 2/147 |

OTHER PUBLICATIONS

Spanner, "Survey of the various operating principles of ultrasonic piezomotors." In *Proceedings of the 10th International Conference on New Actuators*. 2006.

* cited by examiner

ULTRASONIC MOTOR ROTARY ACTUATOR FOR HARD DISK DRIVE

The disclosure relates to motors and methods for driving hard disk drive rotary actuators.

SUMMARY

In accordance with certain aspects, the present disclosure describes ultrasonic motor assemblies, rotary actuator assemblies, and hard disk drives that incorporate such ultrasonic motor assemblies and rotary actuator assemblies. Such actuator assemblies may include one or more actuator arms attached to an E-block housing rotatable around a pivot bearing affixed within the E-block housing. Such ultrasonic motor assemblies may be incorporated into the E-block housing and configured to rotate the pivot bearing, the ultrasonic motor assemblies including a piezoelectric element capable of being operated in an ultrasonic frequency resonance mode to thereby generate a traveling wave, and a preload spring disposed to maintain engagement between the piezoelectric element and the pivot bearing.

In certain aspects, the ultrasonic motor assembly includes a spacer element disposed between the preload spring and the piezoelectric element. The spacer element may be used to set an amount of preload on the preload spring.

In certain aspects, the ultrasonic motor assembly includes a ceramic plate disposed between the piezoelectric element and the pivot bearing.

In certain aspects, the preload spring is a spring wave plate, for example made of stainless steel.

In certain aspects, the piezoelectric element includes an annular piezoelectric ceramic core having top and bottom surfaces, wherein the top surface includes four segmented electrodes, and wherein the bottom surface includes at least one counter electrode. In certain aspects, the bottom surface of the piezoelectric element includes four segmented electrodes.

In certain aspects, the E-block housing of the actuator assembly includes a slot providing access for electrical connections to the piezoelectric element.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
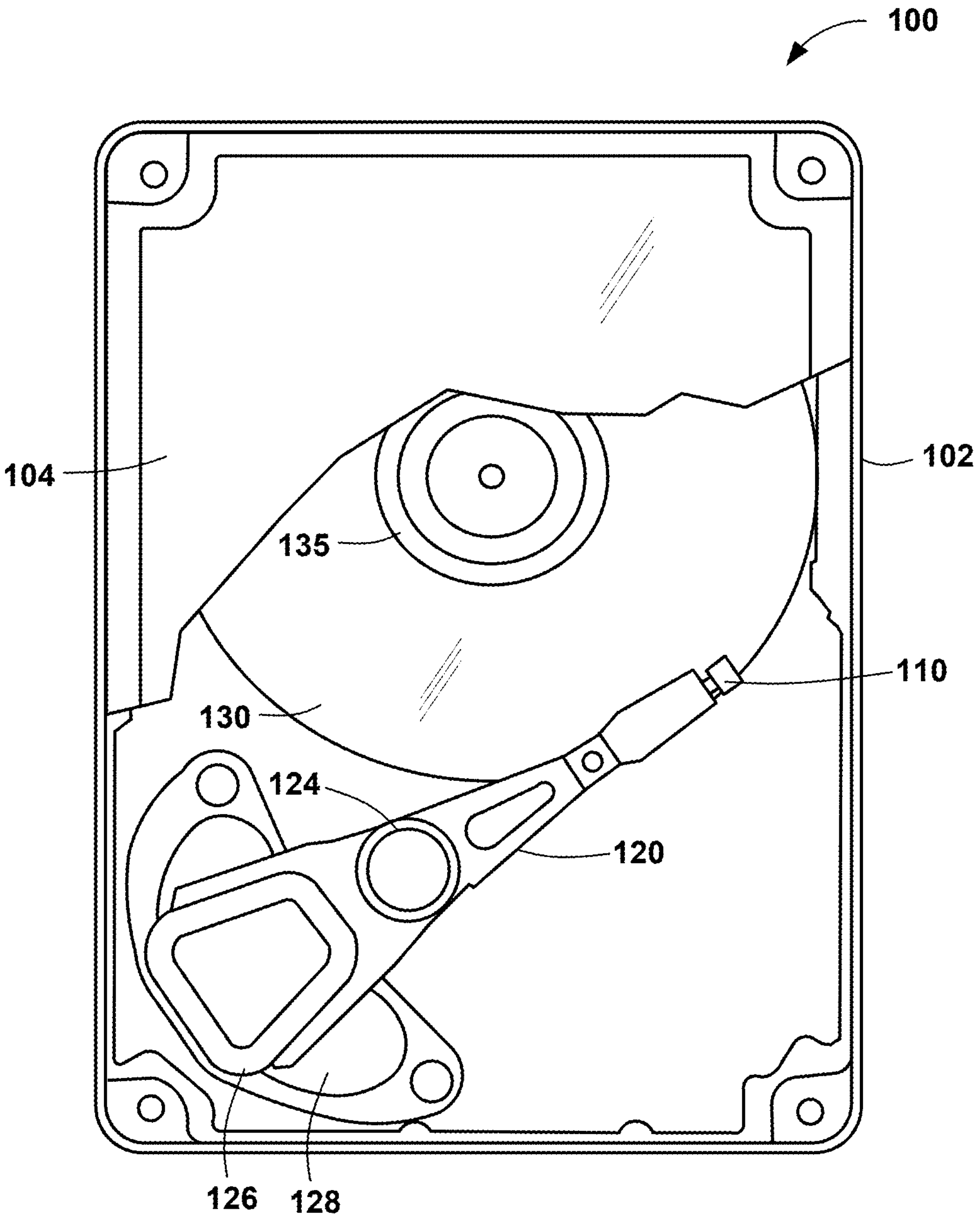
FIG. 1 (prior art)
FIG. 1 schematically shows components in a conventional hard drive that includes a voice coil motor driven actuator stack.

The present disclosure relates to the use of a piezoelectric ultrasonic motor (USM) to drive the rotary motion of an actuator arm assembly in a hard disk drive (HDD). Such USMs may be used in place of electromagnetic means such as a conventional voice coil motor (VCM). In particular, in accordance with various aspects, the present disclosure relates to the use of a USM that includes a ring-shaped piezoelectric element engineered to produce a traveling wave that actuates the rotation of a hub such as a hard drive actuator stack E-block. In accordance with aspects of the present disclosure, motor designs utilizing a traveling wave USM to drive rotation of the actuator assembly may achieve a solution that is lighter weight and more cost-effective, that increases the available space inside the HDD enclosure, and that enhances sustainability by reducing power consumption. Moreover, the piezoelectric element can provide precise motion control, which is important for applications requiring high accuracy such as HDDs.

Conventional HDDs utilize a VCM to rotate the actuator. VCMs are relatively large, and are constructed from cold-rolled steel, rare earth magnets, and copper wire, all of which contribute to the overall weight of the HDD. VCMs take up significant space within the HDD enclosure, constraining the optimization of other components that could further enhance system performance. VCMs also consume large amounts of power in their operations, the coil resistance produces unwanted heat, and the coil's mass and moment of inertia significantly add to the mass and moment of inertia of the actuator.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically shows the internal components of a conventional HDD 100. The housing of HDD 100 includes a base 102 and a top cover 104, with a portion of the top cover removed in FIG. 1 to reveal internal components including a stack of magnetic media disks 130 for storing data. The media disks 130 are spun at high rates by a spindle motor 135. Data is written to and read from the media disks 130 using write and read transducers provided on a recording head that is formed as part of a slider 110 that is positioned on the end of an actuator arm 120. In the case of an HDD having multiple recording disks, a stack of such actuator arms interleave with the media disks so that each media disk recording surface is accessible to a recording head. The actuator arms in the stack are attached at an actuator stack electrical and mechanical hub, or E-block, that is rotatably coupled to a pivot 124 for rotation by a VCM that includes a coil 126 and stationary magnets 128. The VCM is generally bulky, heavy, heat-generating, and power consuming due to the coil resistance.

Figure 2A:
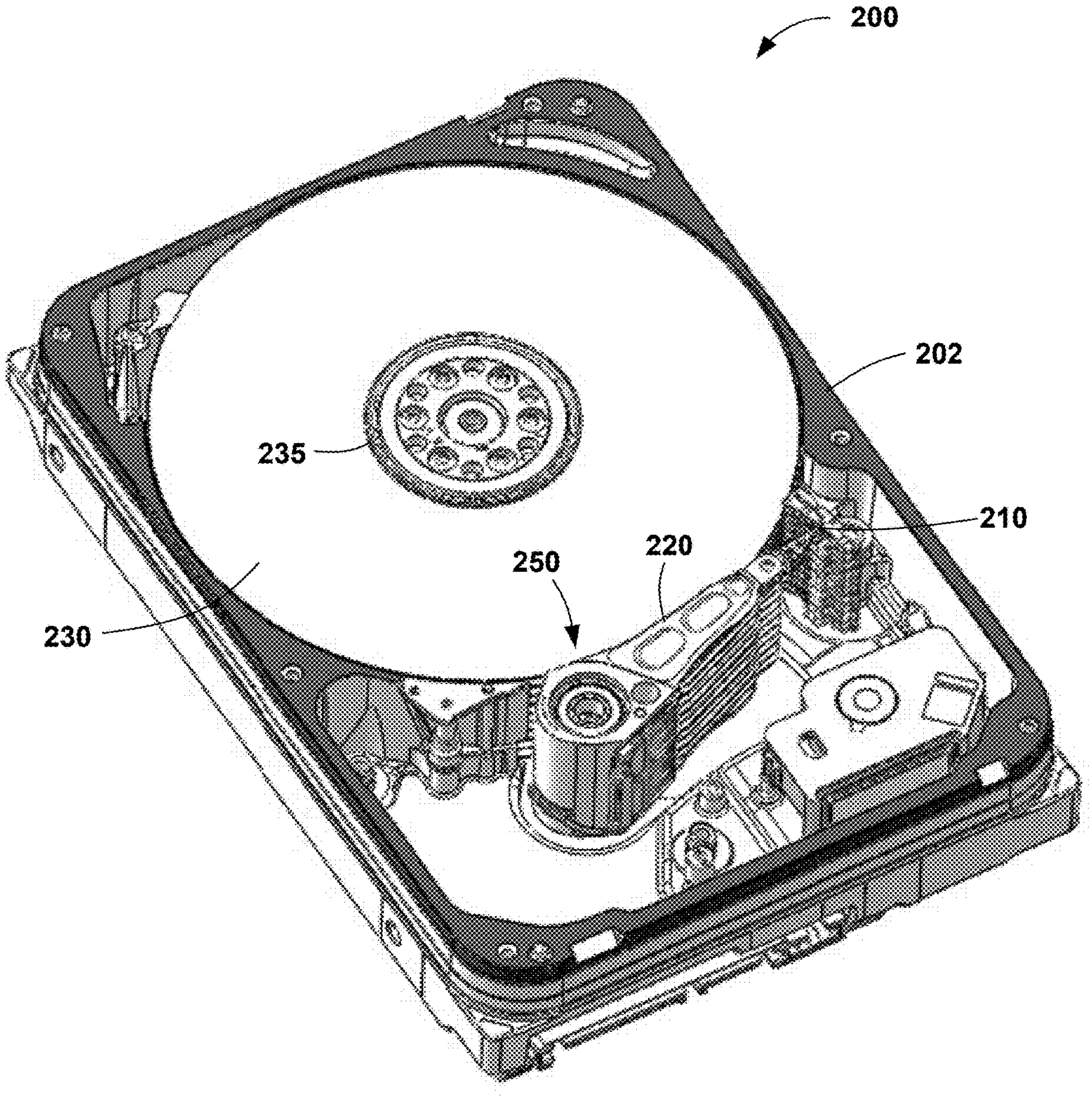
FIGS. 2A-B schematically show components in hard drive constructed to have the actuator stack driven by a piezoelectric ultrasonic motor in accordance with aspects of the present disclosure.
Figure 2B:
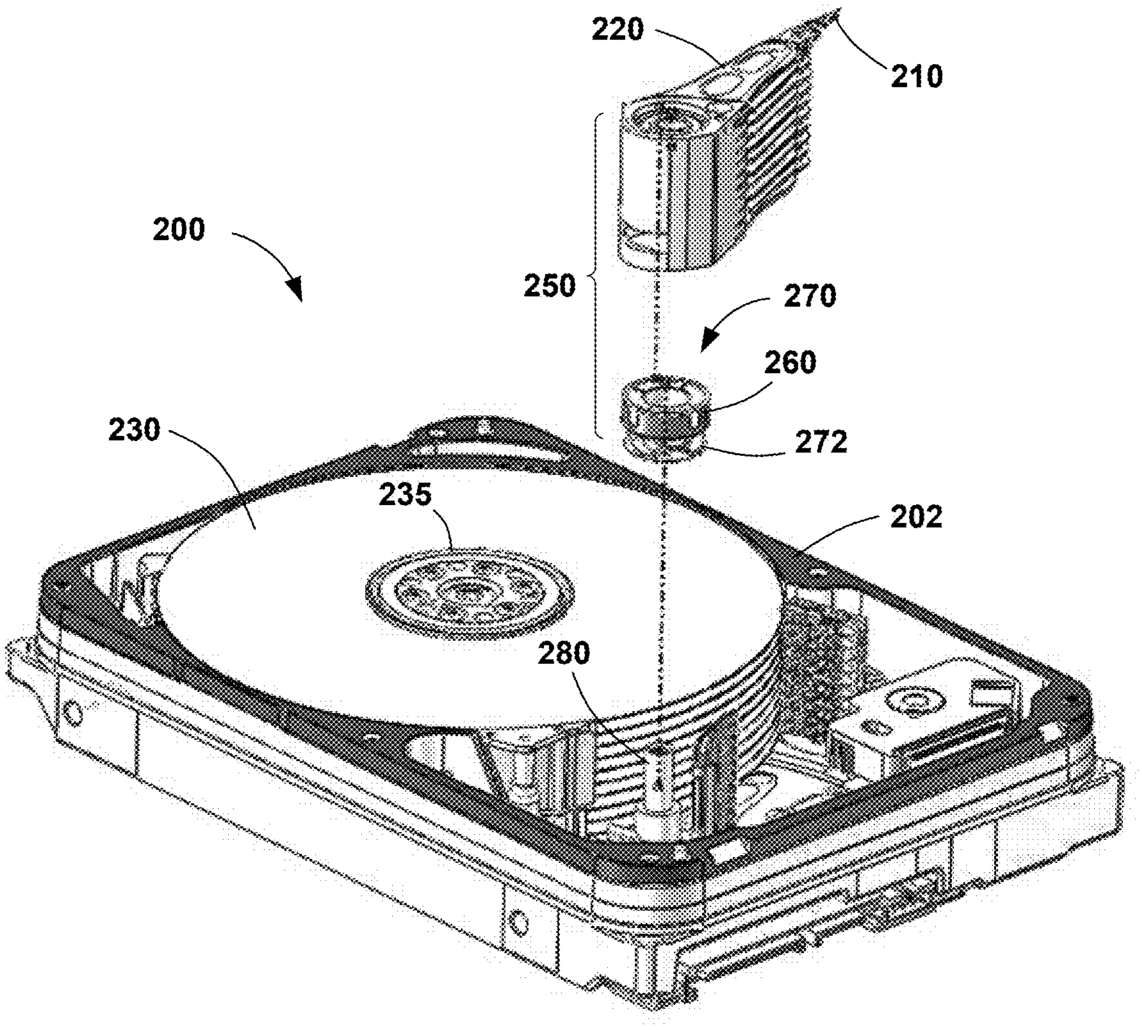

FIGS. 2A and 2B schematically show interior components of an HDD 200 in accordance with various embodiments of the present disclosure. Like a conventional hard drive, HDD 200 has a housing 202 that contains a stack of recording media disks 230 that spin by way of a spindle motor 235. Actuator arms 220 are arranged in a stack and attached to a rotary motor hub assembly 250. A recording head 210 is disposed at the end of each actuator 220 to thereby read and write data on the media disks 230. FIG. 2B shows the rotary motor hub assembly 250 in an exploded view, indicating the ultrasonic motor assembly 270 that includes a piezoelectric element 260 and a wave spring plate 272. The ultrasonic motor assembly 270 fits over a pole 280 that is fixed to the baseplate of housing 202. When assembled, a pivot bearing in the E-block of the actuator assembly allows the actuators to pivot upon activation of the ultrasonic motor.

Including an ultrasonic motor assembly to drive the rotational movement of an actuator assembly in accordance with aspects of the present disclosure allows the voice coil and magnets needed for VCMs to be removed from the interior of the HDD, thereby creating additional space. This additional space within the HDD housing may be used to add another actuator assembly driven by another ultrasonic motor, for example on an opposite side of the rotating magnetic media disks. Such a configuration can double the number of recording heads per disk, thereby increasing data throughput and HDD performance.

Figure 3:
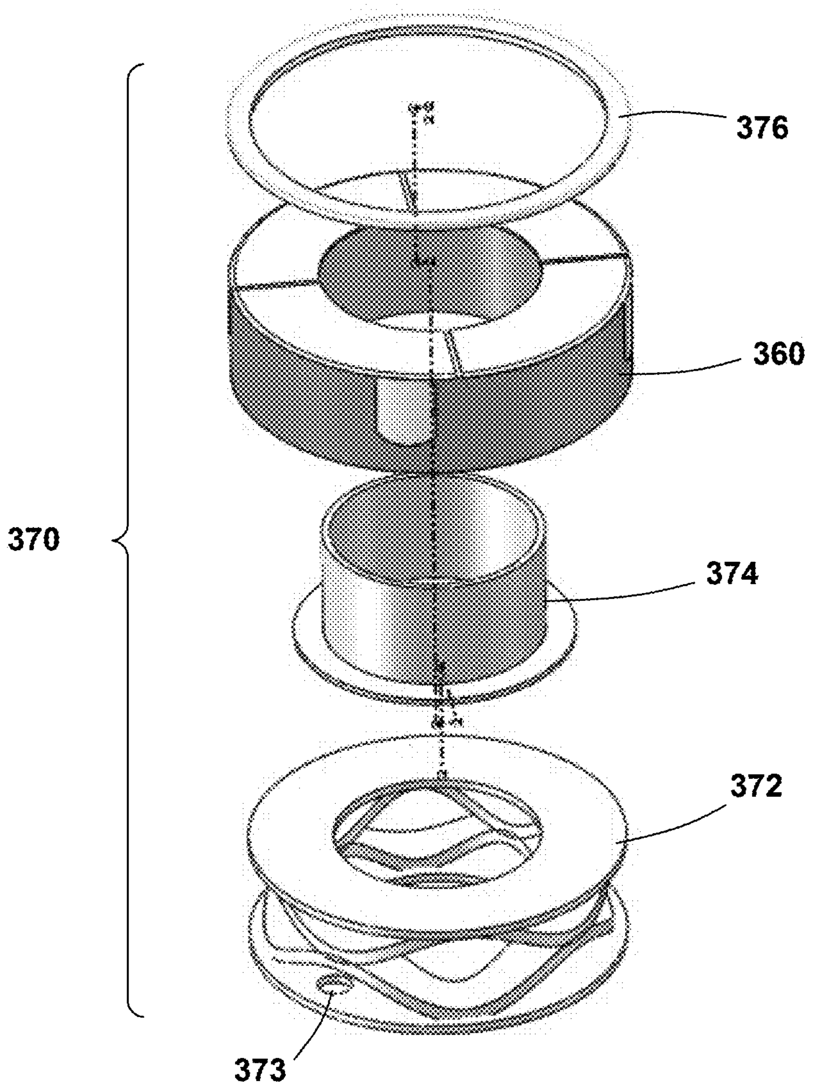
FIG. 3 shows a schematic exploded view of components of a piezoelectric ultrasonic motor in accordance with aspects of the present disclosure.

FIG. 3 shows a schematic exploded view of a traveling wave USM assembly 370 in accordance with certain aspects of the present disclosure. The USM assembly 370 includes wave-shaped spring plate 372, a spacer element 374 disposed on the spring plate 374, a piezoelectric element 360 that fits over the spacer 374, and a ring-shaped ceramic plate 376 that fits over the piezoelectric element 360 to drive rotary motion of the E-bock assembly (not shown). The spring plate 372 may be made of a sufficiently resilient and flexible material such as stainless steel, and may have one or more apertures 373 or other features to assist in positioning and affixing the USM assembly 370 to a base deck of a hard disk drive. The spacer 374 may be made of a non-conductive material such as various plastics or ceramic materials, and may be attached to the wave spring plate 372 using an adhesive or other means. The piezoelectric element 360 is positioned on the spacer 374 to thereby maintain at least a small clearance between the piezoelectric element 360 and the wave spring plate 372 during operation of the USM, thereby electrically isolating the piezoelectric element 360 from wave spring plate 372. The ceramic plate 376 may function as a contact bearing for the USM, and may be adhered to the top of the piezoelectric element 360 to create a frictional interface between the stator and rotor in the final rotary motor assembly, as well as to reduce wear to the piezoelectric element 360 during operation of the USM. The various components of the USM assembly 370 may be attached using fasteners or adhesives as may be suitable for the application.

Figure 4:
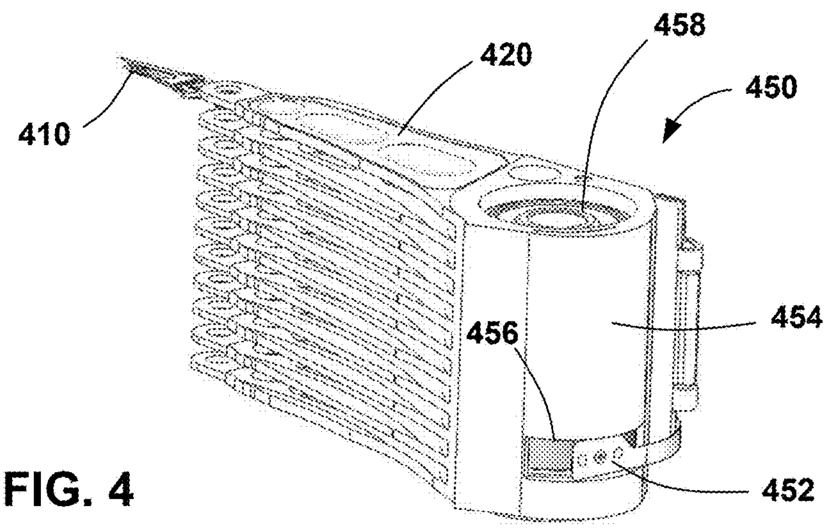
FIG. 4 shows a schematic view of an actuator stack and E-block assembly that incorporates a piezoelectric ultrasonic motor in accordance with aspects of the present disclosure.

FIG. 4 schematically shows an assembled rotary motor E-block assembly 450 having a plurality of attached actuator arms 420, each of which can be equipped with a suspension that carries a slider 410 that includes a recording head. E-block assembly 450 has a cylindrical housing 454 into which a rotary bearing 458 is fixed such that the E-block housing 454 and attached actuator arms 420 can be rotated around the pivot point of the rotary bearing 458. A flexible cable connector 452 can be used to make electrical connections to the piezoelectric element of the USM (not shown) through a slot 456 in the housing 454 of the E-block.

Figure 5A:
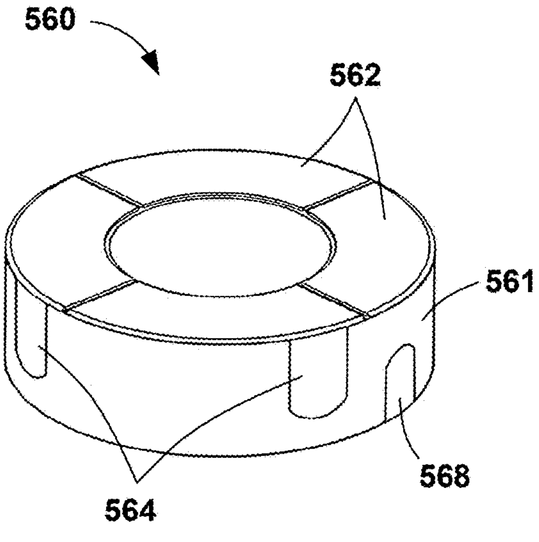
FIGS. 5A-C are schematic view of a piezoelectric element that may be used in a piezoelectric ultrasonic motor in accordance with aspects of the present disclosure.
Figure 5B:
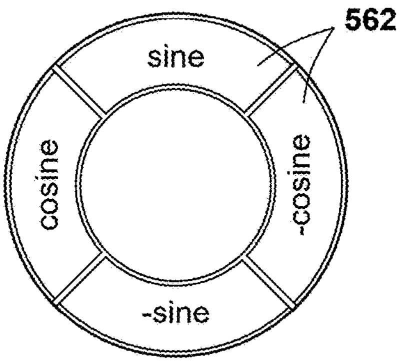
Figure 5C:
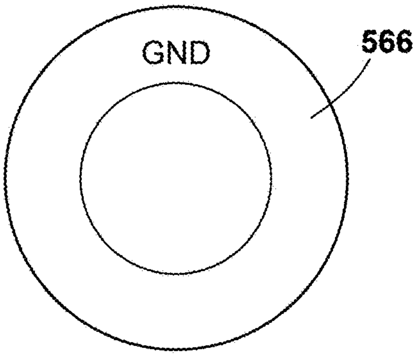

FIGS. 5A-C schematically show an example embodiment of an annular piezoelectric element 560 capable of being excited in an ultrasonic frequency resonance mode to thereby generate a traveling wave that produces rotary motion in accordance with aspects of the present disclosure. The piezoelectric element 560 has an annular piezoelectric ceramic core 561. On the top of the piezoelectric ceramic core 561 are four segmented electrodes 562, each of which is electrically connected to a connector pad 564 wrapped along the outer side wall of the piezoelectric element 560 to facilitate electrical connection. FIG. 5B is the top view of the piezoelectric element, and which indicates an example of the waveform that is provided to each of the four electrodes 562 to thereby generate traveling waves. One pair of opposing electrodes are provided with sine and—sine signals while the other pair of opposing electrodes are provided with cosine and—cosine signals. On the bottom of the piezoelectric ceramic core 561 may be a single annular electrode 566 that is electrically connected to a connector pad 568 wrapped along the outer side wall of the piezoelectric element 560 to facilitate electrical connection. FIG. 5C is the bottom view showing the bottom electrode 566, which is connected to ground.

In other embodiments, rather than using a single bottom electrode 566 that is grounded, the piezoelectric element 560 may include four segmented bottom electrodes similar to and aligned with the four segmented top electrodes 562. In such a configuration the voltage provided to each bottom segmented electrode may be opposite that applied to the corresponding top segmented electrode, thereby boosting the performance of the USM incorporating the piezoelectric element.

Figure 6:
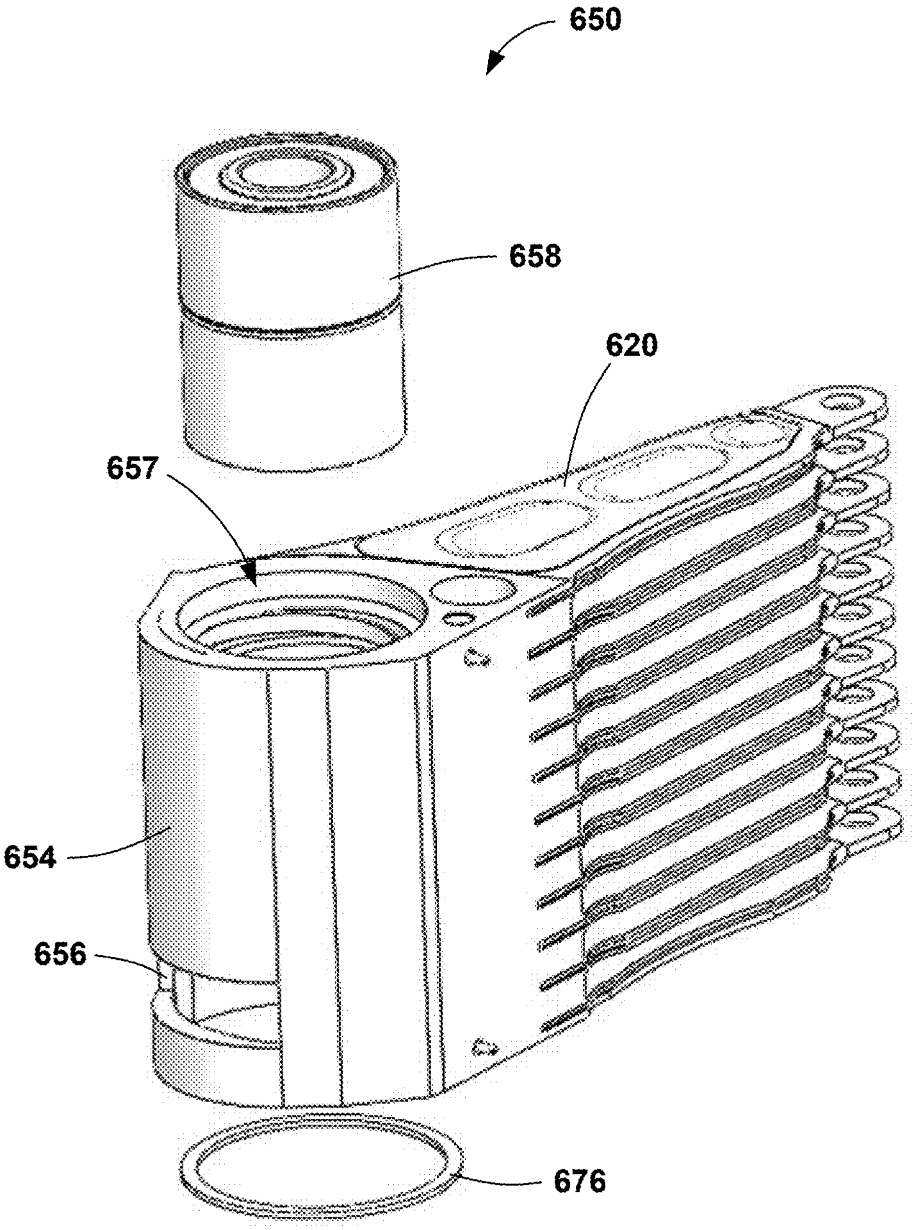
FIG. 6 shows a schematic exploded view of an actuator stack, pivot bearing, and E-block assembly in accordance with aspects of the present disclosure.

FIG. 6 shows an exploded view of a rotary motor E-block assembly 650 having a plurality of attached actuator arms 620. The housing 654 includes a bore 657 into which a pivot bearing 658 is fit such that the housing 654 rotates with rotational movement of the pivot bearing 658 around its pivot point. The housing 654 may include a slot 656 for easily accessing electrodes of the piezoelectric USM (not shown). Alternatively, the USM electrical connections can be established through the HDD baseplate to a printed circuit board, similar to how the media disk spindle motor is electrically connected. A ceramic ring 676 provides a frictional interface for the USM between the stator and rotor of the pivot bearing 658. The ceramic ring 676 may be bonded to the top of the piezoelectric element of the USM (not shown), may be bonded to bottom of the pivot bearing 658, or may be bonded to the interior of the E-block housing 654. The E-block housing 654 covers the USM assembly to contain any particles generated by the ultrasonic motor within the body of the E-block.

Figure 7A:
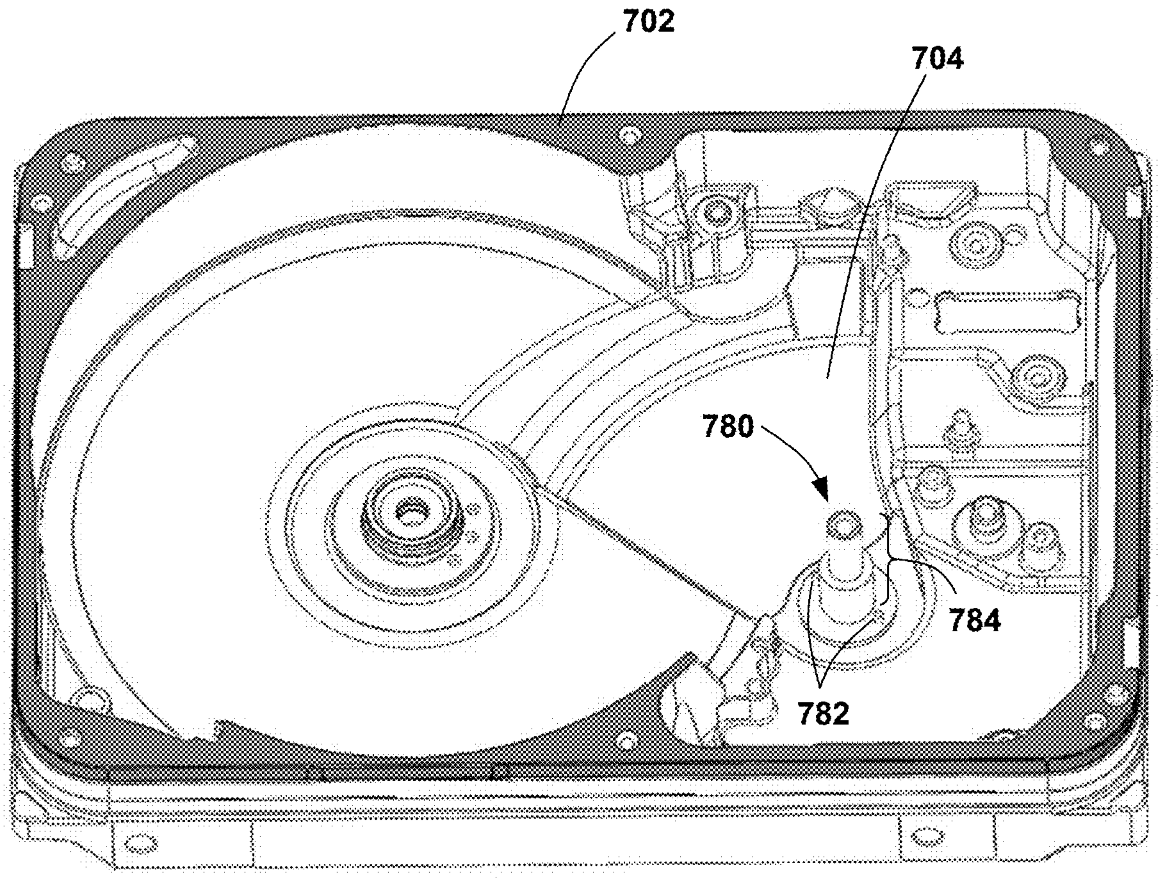
FIG. 7A schematically shows a baseplate for a hard disk drive designed to accommodate an actuator stack and E-block assembly that incorporates a piezoelectric ultrasonic motor in accordance with aspects of the present disclosure.

FIG. 7A schematically shows an HDD housing 702 that includes a baseplate 704. The baseplate 704 includes a pole

Figure 7B:
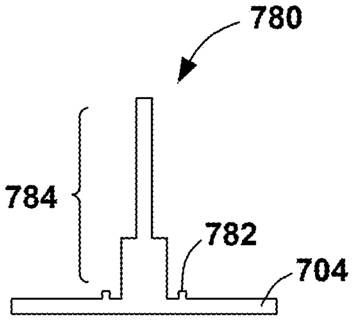
FIGS. 7B-D schematically illustrate the fitting of various piezoelectric ultrasonic motor components onto a hard disk drive baseplate pole.
Figure 7C:
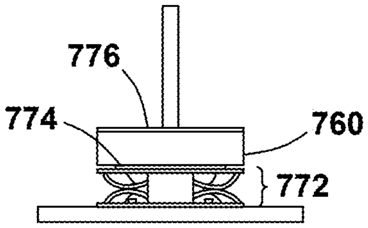
Figure 7D:
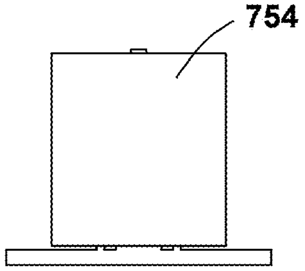

780 affixed thereto, the pole 780 having a two-step profile 784 to guide and secure the USM assembly and E-block assembly. Two locating pins 782 are provided at the base of the pole 780 to aid in the proper orientation and placing of the USM assembly and E-block assembly. FIG. 7B is a schematic side view of the pole 780 having two-step profile 784 and attached to baseplate 704 along with locating pins 782. In FIG. 7C, the USM assembly is added onto the pole, including a wave spring plate 772, a spacer 774, a piezoelectric element 760, and a ceramic plate 776. The locating pins 782 keep the wave spring plate 772 in place, for example with the aid of apertures or other features in the wave spring plate 772. In FIG. 7D, the E-block assembly, which includes the pivot bearing assembly, is added over the USM assembly such that E-block housing 752 contains and conceals the USM assembly. The placing of the E-block assembly compresses the wave spring plate. The entire rotary hub assembly may be secured by fastening a pivot screw to the pole 780 through the HDD cover (not shown). The amount of preload to the wave spring plate can be adjusted by increasing the thickness of the raw material sheet used to fabricate the spacer 774 and/or the overall height of spacer 774. A certain amount of preload will hold the actuator hub rotation assembly in place during shock and vibration events.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," and so forth, means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A hard disk drive for using one or more recording heads to record data on spinning magnetic recording disks, the hard disk drive comprising:

an actuator assembly including one or more actuator arms attached to an E-block housing rotatable around a pivot bearing affixed within the E-block housing, the one or more actuator arms each provided with an associated one of the one or more recording heads and configured to position the associated recording head relative to the spinning magnetic recording disks; and an ultrasonic motor assembly incorporated into the E-block housing and configured to rotate the pivot bearing, the ultrasonic motor assembly including a piezoelectric element capable of being operated in an ultrasonic frequency resonance mode to thereby generate a traveling wave, and a preload spring disposed between the piezoelectric element and a baseplate of the hard disk drive.

2. The hard disk drive of claim 1, wherein the ultrasonic motor assembly further comprises a spacer element disposed between the preload spring and the piezoelectric element.

3. The hard disk drive of claim 2, wherein the spacer element is used to set an amount of preload on the preload spring.

4. The hard disk drive of claim 1, wherein the ultrasonic motor assembly further comprises a ceramic plate disposed between the piezoelectric element and the pivot bearing.

5. The hard disk drive of claim 1, wherein the preload spring is a spring wave plate.

6. The hard disk drive of claim 5, wherein the spring wave plate is made of stainless steel.

7. The hard disk drive of claim 1, wherein the piezoelectric element comprises an annular piezoelectric ceramic core having top and bottom surfaces, wherein the top surface includes four segmented electrodes, and wherein the bottom surface includes at least one counter electrode.

8. The hard disk drive of claim 7, wherein the bottom surface of the piezoelectric element includes four segmented electrodes.

9. The hard disk drive of claim 1, wherein the E-block housing of the actuator assembly includes a slot providing access for electrical connections to the piezoelectric element.

10. The hard disk drive of claim 1, wherein the baseplate includes one or more locating pins that engage with features of the preload spring to thereby hold the preload spring in place.

11. A rotary actuator assembly comprising:

an E-block assembly comprising a housing having an exterior surface and a substantially cylindrical interior surface, a plurality of actuator arms extending from the exterior surface of the housing, and a pivot bearing fitted into the interior surface of the housing such that the E-block assembly is rotatable around a pivot of the pivot bearing; and an ultrasonic motor assembly incorporated into the housing of the E-block assembly and configured to rotate the pivot bearing, the ultrasonic motor assembly comprising a piezoelectric element capable of being operated in an ultrasonic frequency resonance mode to thereby generate a traveling wave, and a preload spring disposed to maintain engagement between the piezoelectric element and the pivot bearing.

12. The rotary actuator assembly of claim 11, wherein the ultrasonic motor assembly further comprises a spacer element disposed between the preload spring and the piezoelectric element.

13. The rotary actuator assembly of claim 12, wherein the spacer element is used to set an amount of preload on the preload spring.

14. The rotary actuator assembly of claim 11, wherein the ultrasonic motor assembly further comprises a ceramic plate disposed between the piezoelectric element and the pivot bearing.

15. The rotary actuator assembly of claim 11, wherein the preload spring is a spring wave plate.

16. The rotary actuator assembly of claim 15, wherein the spring wave plate is made of stainless steel.

17. The rotary actuator assembly of claim 11, wherein the piezoelectric element comprises an annular piezoelectric ceramic core having top and bottom surfaces, wherein the top surface includes four segmented electrodes, and wherein the bottom surface includes at least one counter electrode.

18. The rotary actuator assembly of claim 17, wherein the bottom surface of the piezoelectric element includes four segmented electrodes.

19. The rotary actuator assembly of claim 11, wherein the housing of the E-block assembly includes a slot providing access for electrical connections to the piezoelectric element.

20. The rotary actuator assembly of claim 11, wherein the preload spring includes one or more features configured to engage with a mounting surface to thereby hold the preload spring in place.

* * * * *